US009804270B2

(12) United States Patent
Wietfeldt et al.

(10) Patent No.: US 9,804,270 B2
(45) Date of Patent: Oct. 31, 2017

(54) SENSOR-BASED GNSS VIEW ZONE SELECTION

(71) Applicant: QUALCOMM Incorporated, San Diego, CA (US)

(72) Inventors: Richard Dominic Wietfeldt, San Diego, CA (US); George Chrisikos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 14/841,251

(22) Filed: Aug. 31, 2015

(65) Prior Publication Data

US 2017/0059715 A1    Mar. 2, 2017

(51) Int. Cl.
| | |
|---|---|
| *G01S 19/42* | (2010.01) |
| *G01S 19/26* | (2010.01) |
| *G01S 19/28* | (2010.01) |
| G01S 19/22 | (2010.01) |
| G01S 19/34 | (2010.01) |
| G01S 19/46 | (2010.01) |

(52) U.S. Cl.
CPC ............ *G01S 19/26* (2013.01); *G01S 19/28* (2013.01); *G01S 19/42* (2013.01); G01S 19/22 (2013.01); G01S 19/34 (2013.01); G01S 19/46 (2013.01)

(58) Field of Classification Search
CPC .......... G01S 19/42; G01S 19/26; G01S 19/28
USPC ................................... 342/357.25
See application file for complete search history.

(56) References Cited

U.S. PATENT DOCUMENTS

| | | | |
|---|---|---|---|
| 6,278,404 B1 | 8/2001 | Niles | |
| 7,928,903 B2 | 4/2011 | Rhodes et al. | |
| 2007/0262900 A1 | 11/2007 | Haverkamp et al. | |
| 2011/0068979 A1 | 3/2011 | Waters et al. | |
| 2012/0293365 A1 | 11/2012 | Ashjaee et al. | |
| 2012/0293678 A1* | 11/2012 | Amor Molares | H04N 5/772 348/222.1 |
| 2013/0169474 A1* | 7/2013 | White | G01S 19/28 342/357.23 |
| 2014/0062777 A1* | 3/2014 | MacGougan | G01S 19/24 342/357.43 |
| 2014/0070991 A1 | 3/2014 | Liu et al. | |
| 2015/0032371 A1 | 1/2015 | Youssef et al. | |
| 2015/0035700 A1 | 2/2015 | Van Diggelen et al. | |
| 2016/0066157 A1* | 3/2016 | Noorshams | G01C 21/206 455/457 |

OTHER PUBLICATIONS

International Search Report and Written Opinion—PCT/US2016/039970—ISA/EPO—dated Feb. 7, 2017—18 pgs.
Partial International Search Report—PCT/US2016/039970—ISA/EPO—dated Oct. 28, 2016—7 pgs.

* cited by examiner

*Primary Examiner* — Harry Liu
(74) *Attorney, Agent, or Firm* — Hunter Clark PLLC

(57) ABSTRACT

Techniques for acquiring Global Navigation Satellite System (GNSS) signals at a mobile device are provided. An example process according to these techniques includes receiving sensor data from at least one sensor of the mobile device, determining one or more blocked zones based on the sensor data in which at least a portion of signals from at least one space vehicle (SV) are blocked by an obstruction, selecting one or more SVs from SV information based on the one or more blocked zones, and attempting to acquire signals from the one or more SVs.

30 Claims, 7 Drawing Sheets

Mobile Device

Mobile Device

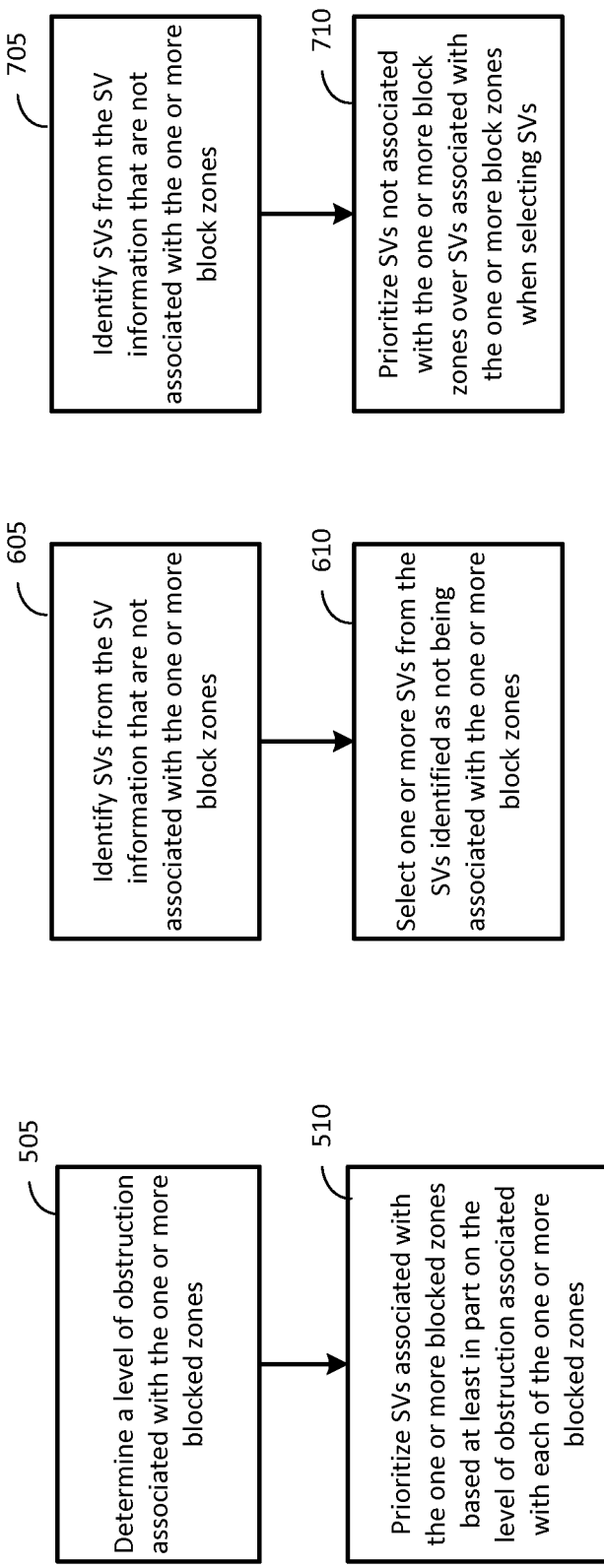

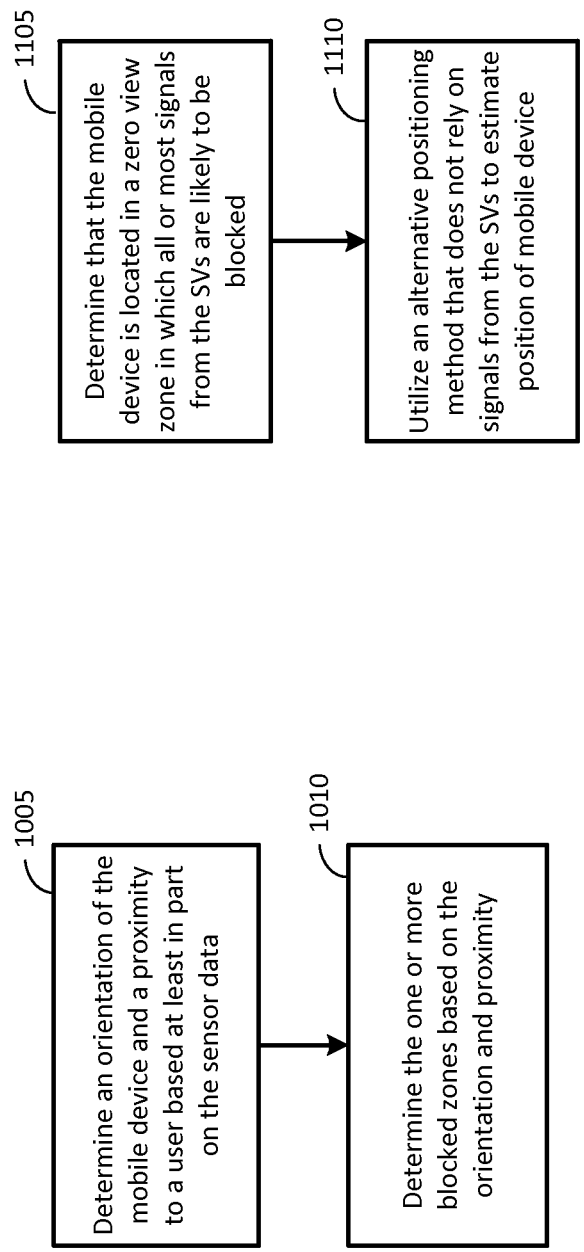

SENSOR-BASED GNSS VIEW ZONE SELECTION

BACKGROUND

The position of a mobile wireless device can be used to provide location-based services to users of the mobile wireless device. Some mobile devices make use of signals from Global Navigation Satellite Systems (GNSSs) to determine the position of the mobile device. However, acquiring the signals of the satellite vehicles of the GNSSs requires processing time and consumes power. Conventional approaches for acquiring the satellite signals may waste processing time and power attempting to acquire signals from SVs that are obstructed from reaching the mobile device.

SUMMARY

An example method for acquiring Global Navigation Satellite System (GNSS) signals at a mobile device according to the disclosure includes receiving sensor data from at least one sensor of the mobile device, determining one or more blocked zones based on the sensor data in which at least a portion of signals from at least one space vehicle (SV) are blocked by an obstruction, selecting one or more SVs from the SV information based on the one or more blocked zones, and attempting to acquire signals from the one or more SVs.

Implementations of such a method may include one or more of the following features. Accessing the SV information includes accessing satellite assistance data comprising the SV information. Selecting the one or more SVs from the SV information based on the one or more blocked zones includes selecting SVs not associated with the one or more blocked zones. Selecting the one or more SVs from the SV information based on the one or more blocked zones includes prioritizing SVs not associated with the one or more blocked zones over SVs associated with the one or more blocked zones. Determining the one or more blocked zones based on the sensor data includes determining a level of obstruction associated with the one or more blocked zones; selecting the one or more SVs from the SV information based on the one or more blocked zones includes prioritizing SVs not associated with the one or more blocked zones over SVs based at least in part on the level of obstruction associated with each of the one or more blocked zones. Determining the one or more blocked zones based on the sensor data includes identifying obstructions that are likely to obstruct signals from the one or more SVs. The sensor data comprises image data from a camera of the mobile device, and identifying the obstructions that are likely to obstruct signals from the one or more SVs includes identifying the obstructions using the image data. Determining the one or more blocked zones based on the sensor data includes determining the one or more blocked zones based on at least one of an orientation of the mobile device and physical proximity of the mobile device to a user of the mobile device. Determining the one or more blocked zones based on the sensor data includes determining that the mobile device is located in a zero view zone in which all or most signals from the SVs are likely to be blocked, and utilizing an alternative positioning method that does not rely on signals from the SVs to estimate a position of the mobile device. Determining the one or more blocked zones based on the sensor data includes identifying a portion of a coverage area of an omnidirectional antenna of a GNSS receiver of the mobile device. The mobile device is stationary. Attempting to acquire signals from the one or more SVs includes allocating correlators of a GNSS receiver of the mobile device for acquiring signals from the one or more SVs from the SV information.

An example apparatus according to the disclosure includes means for receiving sensor data from at least one sensor of the mobile device, means for determining one or more blocked zones based on the sensor data in which at least a portion of signals from at least one space vehicle (SV) are blocked by an obstruction, and means for attempting to acquire signals from the one or more SVs.

Implementations of such an apparatus may include one or more of the following features. The means for selecting the one or more SVs from the SV information based on the one or more blocked zones includes means for selecting SVs not associated with the one or more blocked zones. The means for selecting the one or more SVs from the SV information based on the one or more blocked zones includes means for prioritizing SVs not associated with the one or more blocked zones over SVs associated with the one or more blocked zones. The means for determining the one or more blocked zones based on the sensor data includes means for determining a level of obstruction associated with the one or more blocked zones, and the means for selecting the one or more SVs from the SV information based on the one or more blocked zones includes means for prioritizing SVs not associated with the one or more blocked zones over SVs based at least in part on the level of obstruction associated with each of the one or more blocked zones. The means for determining the one or more blocked zones based on the sensor data includes means for identifying obstructions that are likely to obstruct signals from the one or more SVs. The means for determining the one or more blocked zones based on the sensor data includes means for determining the one or more blocked zones based on at least one of an orientation of the mobile device and physical proximity of the mobile device to a user of the mobile device.

An example mobile device according to the disclosure includes a processor. The processor is configured to receive sensor data from at least one sensor of the mobile device, determine one or more blocked zones based on the sensor data in which at least a portion of signals from at least one space vehicle (SV) are blocked by an obstruction, select one or more SVs from the SV information based on the one or more blocked zones, and attempt to acquire signals from the one or more SVs.

The processor being configured to select the one or more SVs from the SV information based on the one or more blocked zones is further configured to select SVs not associated with the one or more blocked zones. The processor being configured to select the one or more SVs from the SV information based on the one or more blocked zones is further configured to prioritizing SVs not associated with the one or more blocked zones over SVs associated with the one or more blocked zones. The processor being configured to determine the one or more blocked zones based on the sensor data is further configured to determine a level of obstruction associated with the one or more blocked zones, and the processor being configured to select the one or more SVs from the SV information based on the one or more blocked zones is further configured to prioritize SVs not associated with the one or more blocked zones over SVs based at least in part on the level of obstruction associated with each of the one or more blocked zones. The processor being configured to determine the one or more blocked zones based on the sensor data is further configured to identify obstructions that are likely to obstruct signals from the one or more SVs. The processor being configured to determine the one or more blocked zones based on the sensor data is further configured to determine the one or more blocked zones based on at least one of an orientation of the mobile device and physical proximity of the mobile device to a user of the mobile device.

An example non-transitory, computer-readable medium according to the disclosure has stored thereon computer-readable instructions for acquiring Global Navigation Satellite System (GNSS) signals at a mobile device. The instruction are configured to receive sensor data from at least one sensor of the mobile device, determine one or more blocked zones based on the sensor data in which at least a portion of signals from at least one space vehicle (SV) are blocked by an obstruction, select one or more SVs from the SV information based on the one or more blocked zones, and attempt to acquire signals from the one or more SVs.

Implementations of such a non-transitory, computer-readable medium can include one or more of the following features. The instructions configured to cause the computer to select the one or more SVs from the SV information based on the one or more blocked zones include instructions configured to cause the computer to select SVs not associated with the one or more blocked zones. The instructions configured to cause the computer to select the one or more SVs from the SV information based on the one or more blocked zones include instructions configured to cause the computer to prioritize SVs not associated with the one or more blocked zones over SVs associated with the one or more blocked zones. The instructions configured to cause the computer to determine the one or more blocked zones based on the sensor data include instructions configured to cause the computer to determine a level of obstruction associated with the one or more blocked zones, and the instructions configured to cause the computer to select the one or more SVs from the SV information based on the one or more blocked zones include instruction configure to cause the computer to prioritize SVs not associated with the one or more blocked zones over SVs based at least in part on the level of obstruction associated with each of the one or more blocked zones. The instructions configured to cause the computer to determine the one or more blocked zones based on the sensor data further comprise instructions configured to cause the computer to identify obstructions that are likely to obstruct signals from the one or more SVs. The instructions configured to cause the computer to determine the one or more blocked zones based on the sensor data include instructions configured to cause the computer to determine the one or more blocked zones based on at least one of an orientation of the mobile device and physical proximity of the mobile device to a user of the mobile device.

BRIEF DESCRIPTION OF THE DRAWINGS

FIG. 5 is a flow diagram of an example process for acquiring Global Navigation Satellite System (GNSS) signals at a mobile device according to the techniques discussed herein.

FIG. 6 is a flow diagram of an example process for acquiring Global Navigation Satellite System (GNSS) signals at a mobile device according to the techniques discussed herein.

FIG. 7 is a flow diagram of an example process for selecting one or more SVs from the SV information according to the techniques discussed herein.

FIG. 10 is a flow diagram of an example process for determining one or more blocked zones according to the techniques discussed herein.

FIG. 11 is a flow diagram of an example process for selecting one or more SVs from the SV information according to the techniques discussed herein.

DETAILED DESCRIPTION

Figure 1:
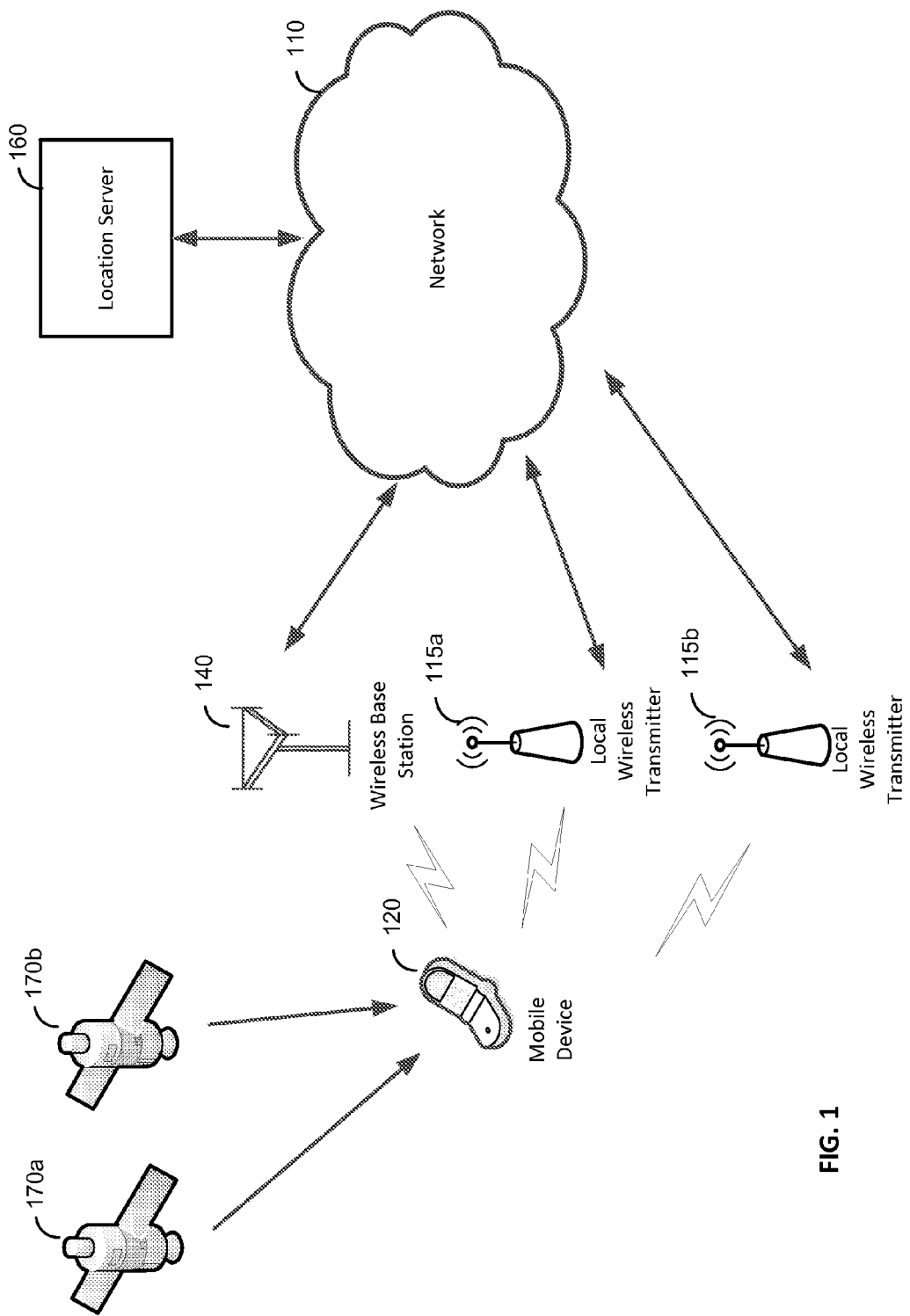
FIG. 1 is a block diagram of an example network architecture, which may be suitable for implementing the techniques discussed herein.

Techniques are disclosed that provide for sensor-based GNSS view zone selection. Sensor data from one or more sensors of a mobile device can be used to reduce the 3D search region for GNSS SV signals comprising delay, frequency, and space. Reducing the search region can reduce the number of correlators required by the GNSS receiver of the mobile device, including requiring fewer correlators per SV. Reducing the number of correlators can provide for lower power operation, thereby decreasing the drain on battery power of the mobile device, and can provide for faster Time to First Fix (TTFF) for the GNSS receiver. The GNSS receiver of the mobile device can be configured to use correlators that are freed up by the techniques disclosed herein to improve the TTFF and/or to provide a more robust position solution. The techniques disclosed herein can be used while the mobile device is stationary and/or while the mobile device is in motion.

The GNSS antenna or antennas of the GNSS receiver of the mobile device can be blocked from viewing the signals of SVs due to device orientation and/or physical placement of mobile device. For example, a user of the mobile device may hold the mobile device near the person's head or body during a phone call. Obstructions in the physical environment surrounding the mobile device, such as buildings, trees, and/or natural or made-made objects can also obstruct SV signals. The techniques disclosed herein use sensor data to determine an orientation and physical location of the antenna and/or antenna beam pattern of the GNSS receiver relative to one or more obstructions. One or more "blocked zones" can be determined in which at least one obstruction prevents at least a portion of signals from at least one SV from reaching the mobile device. The at least one obstruction may be likely to fully obstruct or to partially obstruct the signals from the at least one SV from reaching the mobile device. The SVs from one or more GNSS systems that are likely to be in the blocked zones can be determined and SVs from the one or more GNSS systems that are likely to be outside of the blocked zones can also be determined. A determination can be made whether a threshold number of SVs should be outside of the blocked zones and the signals from these SVs should be able to reach the GNSS receiver of the mobile device. If an insufficient number of SVs are determined to be outside of the blocked zones, the GNSS receiver can reallocate resources that would originally have been allocated to acquiring signals from SVs within a blocked zone to one or more other SVs that have been determined to be outside of a blocked zone. An ordered list of these SVs can be generated. The ordering of the ordered list can depend on predicted or measured signal to noise ratio (SNR), signal to interference plus noise ratio (SNR), received signal strength indication (RSSI), and/or other signal characteristics based on the position of the SV (as determined from almanac or other information), predicted or measured multi-radio coexistence impact, other factors, or a combination thereof. Multi-radio coexistence impact can also be referred to as "desense" and represents the impact of concurrent radio transmissions within a mobile device causing issues in one or more receivers of the mobile device. The SV selection unit 362 can also use SV information obtained from one or more recent fixes in addition to or instead of the almanac information. The SV information obtained from one or more recent fixes can include information identifying one or more SVs from which the mobile device was able to receive signals at the one or more recent position fixes. The SV information from the one or more recent fixes can be used in conjunction with almanac information to determine one or more SVs that may fall within a blocked zone. The techniques discussed herein are dynamic, and the mobile device can be configured to periodically update the blocked zone information either automatically or in response to an instruction received from the network and/or from an application or unit of the mobile device.

FIG. 1 is a block diagram of an example network architecture, which may be suitable for implementing the techniques discussed herein. The particular configuration illustrated herein is merely an example of one network configuration in which the techniques disclosed herein may be used. Furthermore, an implementation of such a network architecture may include additional elements that are not illustrated herein and have been omitted for the sake of clarity. The example network architecture provides an example of a network environment in which a mobile device in which the techniques disclosed herein may be implemented can operate.

The mobile device 120 may also be a mobile communication device referred to as a User Equipment (UE), a mobile station, a terminal, an access terminal, a subscriber unit, a station, etc. The mobile device 120 may be a smartphone, a tablet computer, a laptop computer, game console, wearable device (such as a smart watch) or other device that includes a wireless transmitter that is configured to communicate using one or more wireless communications protocols, including, but not limited to, the Long Term Evolution (LTE), WLAN, and WiMAX wireless communications protocols. The mobile device 120 can also be configured to support other types of wireless communications protocols and can be configured to support multiple different wireless communications protocols. The wireless transmitter of the mobile device 120 can be configured to send data to and/or receive data from other devices, the wireless transmitters 115, and/or one or more wireless base stations 140.

The mobile device 120 can also be configured to measure signals from one or more wireless base stations or wireless access points, such as the wireless transmitters 115 and the wireless base station 140, and obtain timing measurements (e.g., for time of arrival (TOA) or observed time difference of arrival (OTDOA)), signal strength measurements (e.g., Receive Signal Strength Indication (RSSI)), RTT (round-trip time) and/or signal quality measurements for the wireless base stations. The pseudo-range measurements, timing measurements, signal strength measurements, and/or signal quality measurements may be used to derive a location estimate for the mobile device 120. A location estimate may also be referred to as a position estimate, a position fix, etc. Two terrestrial wireless transmitters are illustrated in this example: 115a and 115b. However, in other implementations, more or less wireless transmitters 115 may be included. The mobile device 120 can also be configured to use a combination of signals from one or more of the satellites 170, the wireless base station 140, and/or the wireless transmitters 115 to determine a position of the mobile device 120.

Each of the wireless transmitters 115 can comprise a WLAN wireless access point configured to operate using the IEEE 802.11 wireless communication standards. But, in some implementations some or all of the wireless transmitters 115 may be configured to utilize other wireless communications protocols, and some network environments may include more than one type of wireless transmitter. Furthermore, while the wireless transmitters 115 are identified as transmitters, the wireless transmitters 115 may be transceivers configured to send and/or receive data wirelessly. The wireless transmitters 115 can be connected to network 110 via a backhaul connection that provides a broadband connection to the network 110. The network 110 may be the Internet and/or a combination of one or more networks. For example, the wireless transmitter (such as one of the wireless transmitters 115) may be connected to a DSL modem or a cable modem, depending upon the type of broadband service being used in that particular implementation. A wireless transmitter (such as one of the wireless transmitters 115) can be associated with a mobile communication network provider and can be configured to communicate with the mobile communication network provider's network (not shown) via the network 110. The coverage area of the a wireless transmitter (such as one of the wireless transmitters 115) may overlap with that of one or more macrocell base stations, such as wireless base station 140, or that of one or more other terrestrial transceivers.

The wireless base station 140 can be configured to provide wireless network connectivity to a plurality of mobile devices, such as mobile device 120. The wireless base station 140 can comprise a macrocell base station, a femtocell base station, a picocell base station, or other type of base station. The wireless base station 140 may have a much larger coverage area than the wireless transmitter (such as one of the wireless transmitters 115) or may be a terrestrial transceiver that provides a coverage area that is of a similar size or of a smaller size than the coverage area provided by the wireless transmitters 115. Wireless base station 140 can be configured to communicate using one or more wireless communications protocols. While the example illustrated in FIG. 1 includes on a single wireless base station, in other implementations the network environment is likely to include more than wireless base station 140 which have coverage areas that may overlap at least in part.

The mobile device 120 can be configured to include a Global Navigation Satellite System (GNSS) receiver configured to receive and measure signals from one or more satellites 170, such as satellite 170a and satellite 170b, and to obtain pseudo-range measurements for the satellites 170.

Satellites 170 may be part of a Global Navigation Satellite System (GNSS), which may be the United States Global Positioning System (GPS), the European Galileo system, the Russian GLONASS system, or some other GNSS. The GNSS receiver may also be configured to detect and receive signals from satellites 170 belonging to more than one GNSS system. For example, satellite 170*a* could belong to the GPS system while the satellite 170*b* could belong to the Galileo system. While the example network architecture illustrated herein illustrates only two satellites 170, other implementations may have more or less satellites available, may have satellites associated with one or more GNSS system, and the number of satellites visible to the mobile device 120 may depend upon the current geographical location of the mobile device 120 and the orbits of the satellites 170. Typically, the mobile device 120 will attempt to acquire signals from at least four SVs in order to perform trilateration to determine the location of the mobile device 120. In the techniques disclosed herein, the mobile device 120 can be configured to determine one or more blocked zones from which the signals from the SVs in the one or more blocked zones are likely to be unable to reach the mobile device 120. The one or more blocked zones may be caused by nearby obstructions. For example, buildings or other structures between the mobile device 120 and the SVs can cause a blocked zone in which the signals from the SVs are unlikely to be received at the mobile device 120. A blocked zone can also be caused by the user holding the mobile device 120 proximate to the user's body. For example, the mobile device 120 can be configured to determine that if the user is on a call and is not using a speakerphone or external headset, that mobile device 120 is likely to be held up to the user's head. The user's head may occlude a blocked zone as large as an entire hemisphere, i.e. approximately one half of the coverage area provided by an omnidirectional antenna of the GNSS receiver.

The location server 160 can be configured to provide location services to the mobile device 120. For example, the location server 160 can be configured to provide almanac information and/or other information that the mobile device 120 can use to determine the position of the mobile device 120. The location server 160 can also be configured to assist the mobile device 120 in determining the position of the mobile device 120. For example, the location server 160 can be configured to receive signal measurements of signals received at the mobile device 120 from wireless transmitters 115 and/or wireless base stations (such as wireless base station 140) and to determine a position of the mobile device 120 based on those signals. While the location server 160 is represented as a single entity in the example implementation illustrated in FIG. 1, the logical functions performed by the location server 160 discussed herein can be implemented by more than one network entity.

The example network configuration illustrated in FIG. 1 is merely an example of one possible configuration of a network in which the techniques disclosed herein may be implemented. Other network configurations may include additional elements not illustrated in FIG. 1 and the various components may be interconnected in a different configuration than what is shown in FIG. 1. Furthermore, as discussed above, the mobile device 120 can be implemented such that the mobile device 120 includes a wired connection to the network 110 instead of or in addition to the wireless connections illustrated in FIG. 1. Furthermore, the mobile device 120 can be configured to remain in a relatively fixed location, such as a set-top box, a server computer system, or desktop computer system that may be moved but typically remains in the same location in contrast to the implementation of the mobile device 120 as a mobile device as illustrated in FIG. 1.

Figure 2:
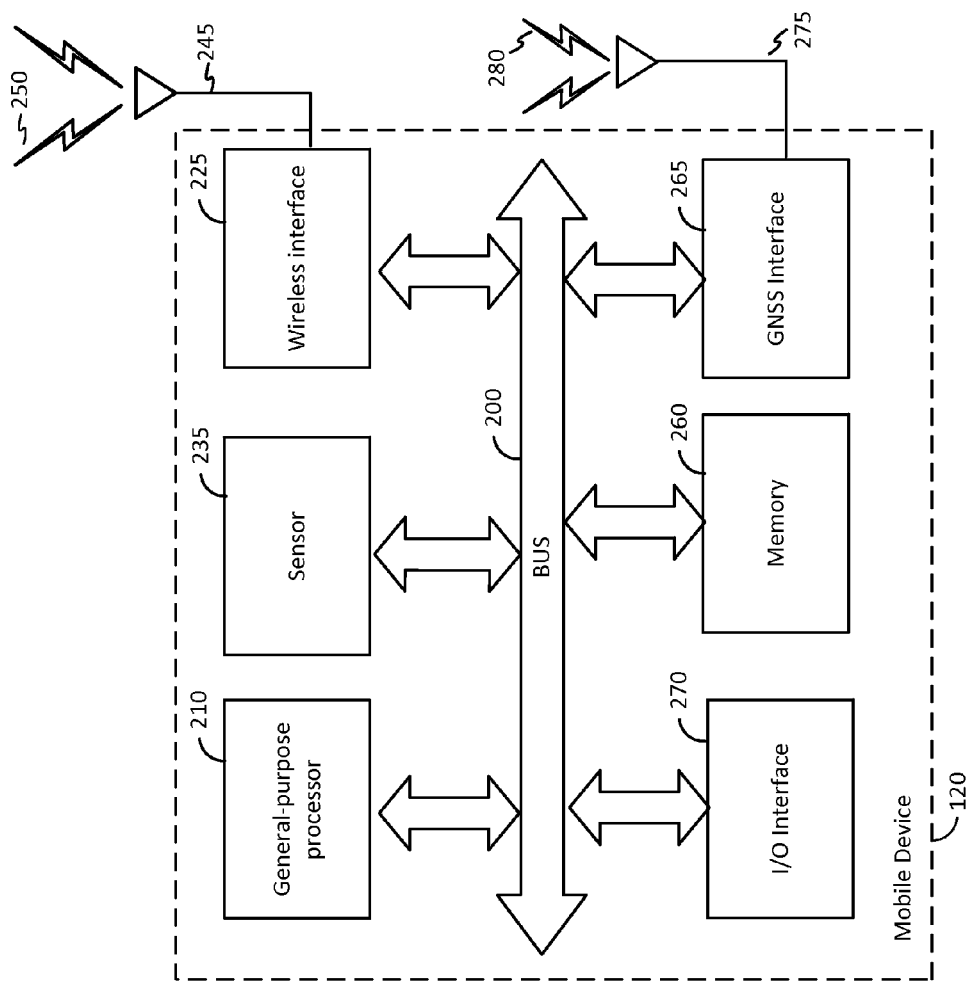
FIG. 2 is a block diagram of an example mobile device that can be used to implement the computing device illustrated in FIG. 1.

FIG. 2 is a block diagram of a computing device that can be used to implement the mobile device 120 illustrated in FIG. 1. The mobile device 120 can be used to implement, at least in part, the processes illustrated in FIG. 4-11. The mobile device 120 can be various types of computing devices, including but not limited to, laptop or other personal computer systems, tablet computers, mobile phones, smart phones, game consoles, wearable devices (e.g., a smart watch, head-mounted device, etc.) and/or other types of computing devices.

The mobile device 120 comprises computer system including at least one processor 210, a wireless interface 225, a GNSS interface 265, and a non-transitory memory 260, connected to each other by a bus 200. The at least one processor 210 can include a general-purpose processor. Other implementations of the mobile device 120 may include additional elements not illustrated in the example implementation of FIG. 2 and/or may not include all of the elements illustrated in the example embodiment illustrated in FIG. 2. Some implementations of the mobile device 120 may not include the GNSS interface 265 and/or the wireless interface 225. The mobile device 120 can include a wired network interface instead of or in addition to the wireless interface 225. The mobile device 120 may be implemented as a set-top box, desktop computing device, or other device that may be moved but typically not intended to be as portable as a mobile phone, tablet computer, a wearable device, or other such device that may be referred to as a mobile device.

The wireless interface 225 can include a wireless receiver, transmitter, transceiver, and/or other elements that enable the mobile device 120 to send and/or receive data using WWAN, WLAN, and/or other wireless communication protocols. The wireless interface 225 can comprise one or more multi-mode modems capable of transmitting and receiving wireless signals using multiple wireless communications standards. The wireless interface 225 is connected an antenna 245 for sending and receiving communications to/from the wireless transmitters 115 as wireless signals 250, the wireless base station 140, and/or other wireless devices configured to communicate using wireless communication protocols. While the mobile device 120 illustrated in FIG. 2 comprises a single wireless interface 225 and a single antenna 245, other implementations of the mobile device 120 can include multiple wireless interfaces 225 and/or multiple antennas 245.

I/O interface 270 can provide one or more ports and/or other interfaces that can provide for data inputs and/or outputs to the mobile device 120. For example, the I/O interface 270 can include one or more ports, such as a Universal Serial Bus (USB) port and/or other type of port that can be used to connect external devices to the mobile device 120. The I/O interface 270 can also include one or more input devices, such as buttons, switches, a keypad, a touchscreen and/or other means for receiving input from a user. The I/O interface 270 can also include one or more means for outputting audio and/or visual content, such as a screen, a speaker, a headphone port and/or other means for outputting such content.

The GNSS interface 265 can include a GNSS receiver and/or other elements that enable the mobile device 120 to receive signals from transmitters associated with one or more GNSS systems. The GNSS interface 265 is connected to an antenna 275 for receiving signals 280 from the GNSS transmitters, such as the satellites 170 illustrated in FIG. 1. The mobile device 120 can be configured to use signals received from satellites associated with satellites and other transmitters associated with the GNSS systems to determine a position of the mobile device 120. The mobile device 120 can also be configured to use the signals received from the satellites and other transmitters associated with the GNSS systems in conjunction with signals received from wireless transmitters 115 and/or wireless base stations (such as wireless base station 140) to determine a position of the mobile device 120.

The at least one sensor 235 can comprise one or more sensors that can be used to collect data that the mobile device 120 can use to identify one or more blocked zones from which signals from an SV are unlikely to be received. The mobile device 120 can include a gyroscope that can be used to determine a three dimensional (3D) orientation of the mobile device 120. The mobile device 120 can also include a magnetometer, which can serve as a compass that can determine the orientation of the mobile device 120 relative to the Earth's magnetic field. The mobile device 120 can also include a proximity sensor that can be used to determine whether the mobile device 120 is being held proximate to the user of the mobile device. Orientation information from a gyroscope, magnetometer, and a proximity sensor can be utilized to determine whether the mobile device is being held up to the left or right side of the side of the head or may be subjected to SV signal occlusion by other parts of the user's body or by other objects. For example, the user's hand or other part of the body may be likely to occlude the signal from the SVs when the mobile device 120 is held in certain orientations or objects. The orientation of the mobile device 120 can also indicate that the device has been placed on a table, desk, or other object if the device is stationary and the orientation remains relatively constant. The proximity sensor can be implemented an infrared sensor, ultrasonic sensor, and/or other type of proximity sensor.

The at least one sensor 235 can also include a pressure sensor that can be used to measure atmospheric pressure around the mobile device 120, which can be used to determine an altitude at which the mobile device 120 is located. The at least one sensor 235 can also include one or more accelerometers that can be used to measure changes in velocity in axial dimensions. The at least one sensor 235 can also include rotational vector sensors for detecting rotation of the mobile device 120. The at least one sensor 235 can also include one or more force sensors and/or touch screen for measuring tactile inputs, such as the user input and/or contact with a portion of the user's body or other object.

The at least one sensor 235 can comprise a camera or other optical sensor that can be used to identify blocking objects, such as buildings, trees, or other man-made or natural objects that are likely to block signals from the SVs from reaching the GNSS receiver of the mobile device 120. The term camera, as used herein, can refer to one or more camera sensing elements. The one or more camera sensing elements can be spatially distributed around the mobile device 120 to provide visual coverage of the area surrounding the mobile device 120. The one or more camera sensing elements can be configured to detect portions of the electromagnetic spectrum that fall within what is typically considered to be the human visual range and/or can be configured to detect portions of the electromagnetic spectrum that fall outside of the typical human visual range. For example, the one or more camera sensing elements can be configured to detect infrared, near infrared (NIR), shortwave infrared (SWIR), and/or ultraviolet portions of the electromagnetic spectrum. The one or more camera elements can be configured to provide thermal imaging and/or night vision capabilities to the camera. The one or more camera elements can be configured to capture one or more still images of a scene around the mobile device 120 and/or to capture video content of the scene around the mobile device. The mobile device 120 can be configured to use the one or more still images and/or video content to identify obstructions proximate to the mobile device.

The antenna 275 may comprise an omnidirectional antenna for receiving signals from the SVs of the GNSS systems for which the mobile device 120 is configured to receive signals. The location of the antenna on the mobile device 120 and the orientation of the mobile device 120 as determined by the sensor information can be used to determine whether the mobile device 120 may be oriented in such a way as to create a blocked zone in which signals from the SVs would likely be blocked from reaching the antenna 275.

Device usage information can also be combined with the sensor data to estimate proximity of the mobile device 120 to the user. For example, usage data from the wireless interface 225 may indicate that mobile device is being used to make a call and is likely to be held proximate to the head of the user of the mobile device 120 if a wireless earpiece is not being utilized, but is not likely to be held proximate to the head of the user of the mobile device 120 if a wireless earpiece is being utilized. The user occlusion of SV signals in these two scenarios could be significantly different based on how the phone is being utilized. In the scenario where the user is estimated to be holding the device next to the user's head, the SV signals from a large area may be blocked. This area can roughly be represented by half a hemisphere. Orientation information from one or more of the sensor types discussed above can be utilized to determine whether the mobile device is being held up to the left or right side of the user's head, and a blocked zone can be determined based on this information. Other use cases for the mobile device 120 can be determined from the device usage information and the sensor data. For example, the mobile device 120 may be stored in a holster next to the user's body, may be held in the user's hand, or placed on a table or other surface. The SV section unit 362 can be configured to combine sensor data with device usage data, such as whether the phone is being used in a speakerphone mode or with a headset being plugged in to determine whether the mobile device is being usage in one of these configurations and to access characteristics of such usage that can be used to determine the blocked zones.

The processor 210 can be an intelligent device, e.g., a personal computer central processing unit (CPU), a microcontroller, an application specific integrated circuit (ASIC), etc. The memory 260 is a non-transitory storage device that can include random access memory (RAM), read-only memory (ROM), or a combination thereof. The memory 260 can store processor-readable, processor-executable software code containing instructions for controlling the processor 210 to perform functions described herein (although the description may read that the software performs the function(s)). The software can be loaded onto the memory 260 by being downloaded via a network connection, uploaded from a disk, etc. Further, the software may not be directly executable, e.g., requiring compiling before execution.

The software in the memory 260 is configured to enable the processor 210 to perform various actions, including implementing sending and/or receiving data from the wireless transmitters 115, the wireless base station 140, other mobile devices, and/or other devices configured for wireless communication. The software in the memory 260 is also configured to enable the processor 210 to perform all or part of one or more of the processes illustrated in FIGS. 4-11. The functional units implemented in software in the examples disclosed herein may alternatively be implemented in hardware or in a combination of hardware and software, including but not limited to analog and/or digital circuits.

Figure 3:
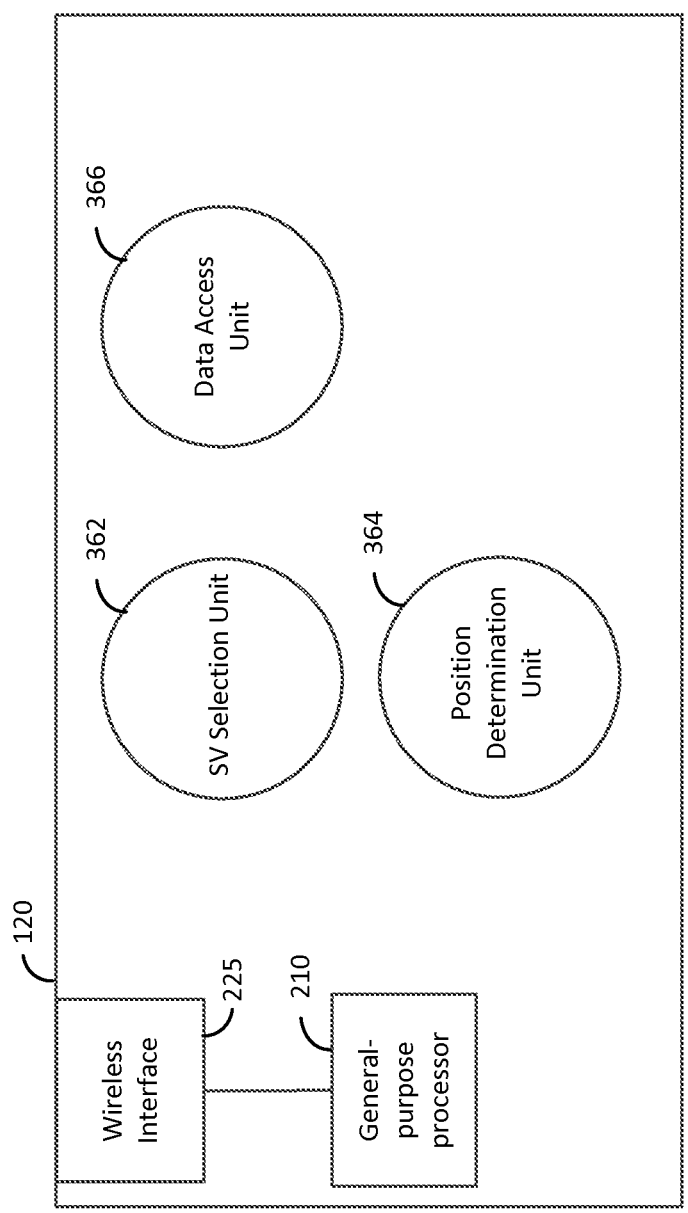
FIG. 3 is a functional block diagram of the mobile device illustrated in FIG. 2 that illustrates functional units of the computing device.

FIG. 3 is a functional block diagram of the mobile device 120 illustrated in FIG. 2 that illustrates functional units of the memory 260 shown in FIG. 2. For example, the mobile device 120 can include a SV selection unit 362, a position determination unit 364, and a data access unit 366. The mobile device 120 may also include one or more additional functional units that provide other functionality to the mobile device 120. The functional units illustrated in FIG. 3 can be implemented as software that can be stored in the memory 260 and executed by the processor 210, implemented as hardware that can be implemented as a portion of the processor 210 or as separate hardware units, or a combination thereof. The mobile device 120 illustrated in FIGS. 2 and 3 can be used to implement the mobile device 120 associated with the processes illustrated in FIGS. 4-11.

The SV selection unit 362 can provide means for implementing the processes illustrated in FIGS. 4-11. The SV selection unit 362 can be configured to use sensor data obtained from the at least one sensor 235 of the mobile device 120 to determine one or more blocked zones in which signals from SVs are likely to be obstructed at the mobile device due to natural and/or man-made obstructions and/or user occlusion of the SV signals. This sensor data can include still images and/or video content captured by the at least one sensor 235. The SV selection unit 362 can be configured to instruct the GNSS receiver to search for a particular set of SVs. The SV selection unit 362 can be configured to prioritize SVs not associated with blocked zones over SVs that are associated with a blocked zone. The SV selection unit 362 can also be configured to associate a level of obstruction with blocked zones. Examples of these features are discusses in greater detail with respect to the example processes illustrated in FIGS. 4-11. The techniques discussed herein are dynamic, and the SV selection unit 362 can be configured to periodically update the blocked zone information either automatically or in response to an instruction received from the network and/or from an application or unit of the mobile device.

The position determination unit 364 can be configured to determine a position of the mobile device 120. The position determination unit 364 can provide means for determining the position of the mobile device based at least in part on signal measurements. For example, the position determination unit 364 can be configured to receive pseudorange data from the GNSS interface 265 and use the pseudorange data to determine a position of the mobile device 120. The position determination unit 364 can also be configured to request and receive almanac data from a network entity, such as the location server 160. The almanac data can include information associated with wireless base stations, wireless transceivers, and/or assistance data that can be used to acquire signals of SVs from one or more GNSS. The position determination unit 364 can also be configured to use measurements of signals received from wireless base stations (such as wireless base station 140) and/or wireless transmitters 115 to determine a position of the mobile device 120. The position determination unit 364 can also be configured to use pseudorange information from the GNSS interface 265 and measurements of signals received from wireless base stations (such as wireless base station 140) and/or wireless transmitters 115 to determine a position of the mobile device 120. The position determination unit 364 can be configured to determine a position of the mobile device 120 by performing trilateration using signal measurements, RSSI (received signal strength indication), RTT (round-trip time)), time of arrival (TOA), to determine a position of the mobile device 120. The position determination unit 364 can be configured to determine the position of the mobile device in response to a request from an application running on the mobile device, in response to an external entity, such as the location server 160, requesting a position of the mobile device, or in response to a request from another unit of the mobile device. Furthermore, the wireless interface 225 can provide means for sending and/or receiving data and/or requests, except for GNSS signal data for which the GNSS receiver of the GNSS interface 265 can provide means for receiving such data. The position determination unit 364 can also be configured to store SV information from recent position fixes for the mobile device, and the SV selection unit 362 can also use the SV information obtained from one or more recent fixes in addition to or instead of the almanac information when determining which SVs may fall into or outside of a blocked zone.

The data access unit 366 can be configured to store data in the memory 260 and/or other data storage devices associated with the mobile device 120. The data access unit 366 can also be configured to access data in the memory 260 and/or other data storage devices associated with the mobile device 120. The data access unit 366 can be configured to receive requests from other units and/or components of the mobile device 120 and to store and/or access data stored in the memory 260 and/or other data storage devices associated with the mobile device 120.

Figure 4:
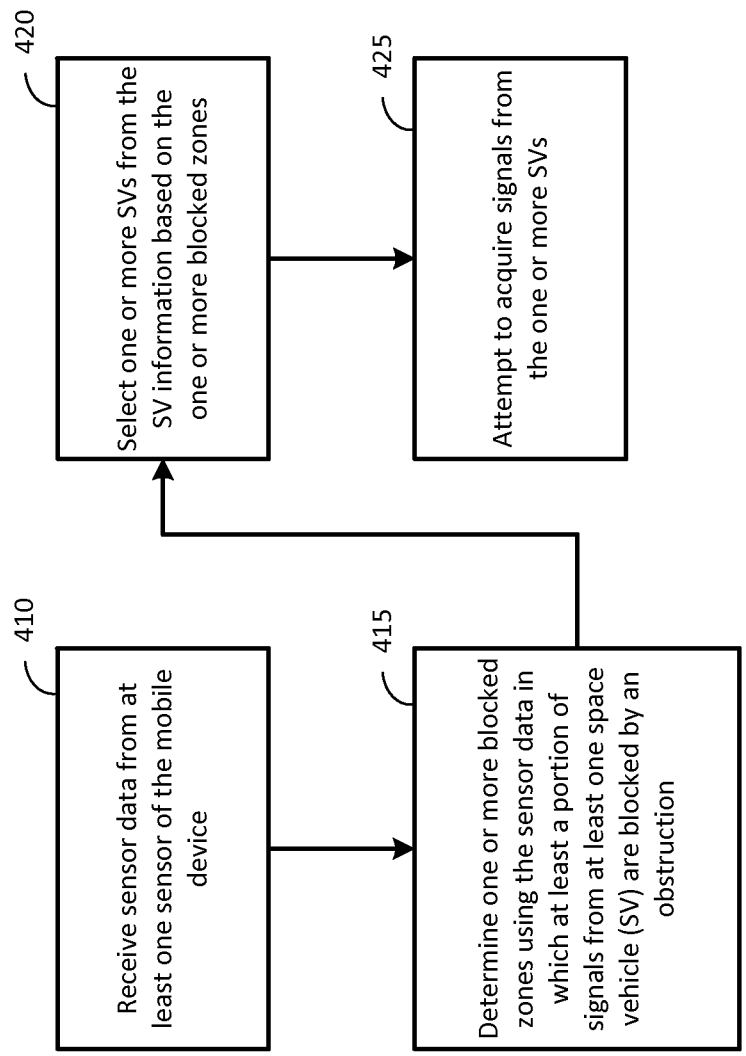
FIG. 4 is a flow diagram of an example process for acquiring Global Navigation Satellite System (GNSS) signals at a mobile device according to the techniques discussed herein.

FIG. 4 is a flow diagram of an example process for acquiring Global Navigation Satellite System (GNSS) signals at a mobile device according to the techniques discussed herein. The process illustrated in FIG. 4 can be implemented using the mobile device 120 illustrated in FIGS. 1-3, unless otherwise specified. The SV selection unit 362 of the mobile device 120 can provide means for performing the various stages of the process illustrated in FIG. 4 unless otherwise specified.

The position determination unit 364 of the mobile device 120 can be configured to use the SV information to determine which SVs may from the one or more GNSSs may be visible to the mobile device 120 at the present time. The SV selection unit 362 can be use a coarse location of the mobile device 120 and the SV information to determine which SVs may be visible to the GNSS receiver of the mobile device 120 at a particular time. The coarse location of the mobile device 120 can be determined by the position determination unit 364 and/or can be obtained from the location server 160 and/or another network entity. However, a number of the SVs that may potentially be visible to the GNSS receiver of the mobile device 120 may in actuality be obstructed for various reasons that will be discussed in greater detail below. However, the SV selection unit 362 can use sensor data collected from at least one sensor 235 of the mobile device 120 to further refine the information as to which SVs may be visible to the mobile device 120, and to expend more resources attempting to acquire signals from satellites whose signals are more likely to be visible at the mobile device 120. As a result, the search region for the GNSS receiver can be reduced, which also can result in the GNSS receiver using fewer correlators to acquire a sufficient number of signals from the SVs to perform a position determination. The use of fewer correlators can result in the GNSS receiver consuming less power and can also result in the GNSS receiver reaching a faster Time to First Fix (TTFF). Correlators that may have been used to attempt to acquire signals from SVs whose signals are likely blocked can be utilized by the GNSS receive to attempt to acquire signals from SVs whose signals are not likely to be blocked, which can provide the faster TTFF and/or a more robust position solution by providing better GNSS sensitivity, lower false alarm rates, increased detection probability, and/or other improvements over conventional signal acquisition techniques.

Sensor data can be received from the at least one sensor 235 of the mobile device 120 (stage 410). As discussed above, the mobile device can include at least one sensor 235, and sensor data can be received from one or more sensors. For example, the mobile device can include a gyroscopic orientation sensor that can be used to determine a three-dimensional (3D) orientation of the mobile device 120 and/or a magnetometer which can also be configured to determine an orientation of the mobile device 120 relative to the Earth's magnetic field. The mobile device 120 can also include a proximity sensor that can be used to determine whether the mobile device 120 is being held in close proximity to the user's body. Other non-sensor data can be combined with the sensor data to further refine the determination as to the signals of which SVs may be blocked and which may be visible. The SV selection unit 362 of the mobile device 120 can be configured to check the status of the wireless interface 225 of the mobile device 120 to determine whether the mobile device 120 is connected on a call and/or a data connection. The SV selection unit 362 can also be configured to determine whether a the device is currently connected on a call and a Bluetooth or other wireless headset is currently being used, which can indicate that the mobile device is not likely to be held to the head of the user of the mobile device or subject to obstructions by other parts of the user's body.

One or more blocked zones can be determined using the sensor data in which at least a portion of signals from at least one space vehicle (SV) are blocked by an obstruction (stage 415). As discussed above, the one or more blocked zones represent areas or volumes in which at least a portion of the signals from one or SVs are likely to be obstructed at the mobile device. The SV selection unit 362 can be configured to use the sensor data from the at least one sensor 235 when determining the blocked zones.

The SV selection unit 362 can be configured to access SV information of one or more GNSS systems. The SV information can stored in the memory 260 of the mobile device 120. The mobile device 120 can also be configured to request assistance data from the location server 160 and the location server 160 and/or another network entity can be configured to provide the assistance data to the mobile device which includes SV information. The SV information can comprise ephemeris data for satellite vehicles in included therein that provide the position of the SVs at a given time. The SV information can include SV information for more than one GNSS system. For example, the SV selection unit 362 can be configured to obtain almanac data that includes ephemeris data for SVs for more than one GNSS. The mobile device 120 can be configured to attempt to acquire signals from SVs from more than one GNSS system in order to determine a location of the mobile device 120.

The SV selection unit 362 can use the SV information and the sensor data to determine the blocked zones and to determine whether a particular SV is expected to fall into a blocked zone. The SV selection unit 362 can also use SV information obtained from one or more recent fixes in addition to or instead of accessing or obtaining almanac information. In a non-limiting example implementation, the SV selection unit 362 can be configured to classify approximately one hemisphere of the SVs as falling into a blocked zone, as these SVs are beyond the horizon and the signals from theses SVs should not be able to reach the GNSS receiver of the mobile device 120. The SV selection unit 362 can also be configured to determine blocked zones having other shapes. For example, in another non-limiting example, the mobile device 120 may be located in on a street or other area that is surrounding by tall buildings other objects and the SV selection unit 362 can determine that the one or more blocked zones encompass all but an area directly above the mobile device 120. These examples are intended to illustrate the variability of the shape and size of the one or more blocked zones based on the location of the mobile device and the various types of obstructions that may be present at that location. The SV selection unit 362 can use the sensor data from the at least one sensor 235 to further define additional blocked zones in which other SVs may fall. The SV selection unit 362 can be configured to use orientation information to determine whether user occlusion, device-based occlusion, and/or environmental occlusion may have created one or more blocked zones. User occlusion can occur where the body of the user of the mobile device blocks the signals from one or more SVs from reaching the GNSS receiver of the mobile device 120. Device-based occlusion can occur where the mobile device 120 itself blocks the signals from one or more SVs from reaching the GNSS receiver of the mobile device 120. Device-based occlusion can occur depending on the location of the antenna or antennas of the GNSS receiver on or in the mobile device 120 and the orientation of the mobile device 120 relative to the SVs. Depending on how the mobile device 120 is oriented, the body of the mobile device 120 can come between the antenna or antennas of the GNSS receiver of the mobile device 120 and one or more SVs, such that the signals from the one or more SVs are blocked. The SV selection unit 362 can be configured to use device information to determine where the antenna or antennas of the GNSS receiver are disposed on or in the mobile device 120. The SV selection unit 362 can be configured to access device specific information from a memory of the mobile device and/or from a network-based entity, such as the location server 160. Environmental occlusion can occur where objects in the environment block signals from the SVs from reaching the GNSS receiver of the mobile device 120.

The SV selection unit 362 can also be configured to use a camera or imaging sensor of the mobile device 120 to identify obstructions that may block signals from one or more SVs. The SV selection unit 362 can also be configured to determine a level of obstruction associated with a blocked zone. The level of obstruction can distinguish between a permeable obstruction, such as a foliage canopy through which some signals from the SVs may pass through and reach the GNSS receiver of the mobile device 120, and impermeable obstruction such as a concrete building which may create an blocked zone in which no signals of the of SVs may pass through to reach the GNSS receiver of the mobile device 120. For example, an area having low density, low-rise buildings can be associated with a lower level of obstruction than an area having a high-density, high-rise buildings. The SV selection unit 362 can be configured to take into consideration other man-made and/or natural objects when determining a level of obstruction for a blocked zone. An example process using the sensor data to identify blocked zones based on an orientation of the mobile device 120 can be found in FIG. 9. An example of a process using the sensor data to identify obstructions can be found in FIG. 8. An example process using the sensor data to identify a level of obstruction can be found in FIG. 5. An example process using the sensor data to determine an orientation of the mobile device 120 and a proximity of the mobile device 120 to a user can be found in FIG. 10. The SV selection unit 362 can be configured to use one or more of these techniques and/or other techniques to determine the blocked zones based on the sensor data.

The blocked zones can be defined as fixed blocked zones and non-fixed blocked zones. Fixed blocked zones are blocked zones that are not dependent upon the orientation of the mobile device and occur at a fixed geographic location. As the orientation of the mobile device changes, the position of the fixed blocked zones does not change. For example, fixed blocked zones could be caused by man-made objects, such as buildings, bridges, or other structures, or by natural features such as hills, valleys, or mountains. The position of such obstructions generally remains fixed even if the orientation of the mobile device changes relative to these obstructions. Non-fixed blocked zones are blocked zones that are dependent on the orientation of the mobile device and are not associated with a fixed geographical location. The location of non-fixed blocked zones change as the orientation of the mobile device changes. For example, the position of blocked zones caused device-based obstructions can change as the mobile device changes and the SV signals that may be blocked by the body of the mobile device change. The SV selection unit 362 can be configured to represent fixed blocked zones using geographical coordinates, and may be configured to represent the blocked zone as a three-dimensional volume located at a particular geographical coordinates. The SV selection unit 362 can be configured to represent non-fixed blocked zones as geometric shapes or volumes that are not associated with a particular geographical location and instead can be defined relative to the mobile device. The SV selection unit 362 can be defined in local coordinate system relative to the mobile device 120. The SV selection unit 362 can be configured to map the local coordinates of a non-fixed blocked zone to geographical coordinates or other coordinate system used in the almanac data or recent fix data to indicate the expected positions of the SVs at a given time. The SV selection unit 362 can be configured to dynamically update the blocked zones, fixed and non-fixed, periodically or dynamically as the position and/or orientation of the mobile device 120 changes. The SV selection unit 362 can be configured to determine which SVs are expected fall within these fixed and non-fixed blocked zones at a given time and to use this information for selecting which SVs from which the GNSS receiver of the mobile device 120 will attempt to acquire signals.

The proximity sensor and orientation sensor data can be used in conjunction with one another to provide a detailed estimate of the orientation and proximity of the mobile device relative to the user of the mobile device. For example, the orientation of the mobile device 120 and proximity sensor data can be used to determine how the user of the mobile device 120 is holding the mobile device 120. The orientation and proximity sensor data can be used to determine whether the user is holding the mobile device in their hand or holding the mobile device 120 to the user's head. The orientation information can be used to determine whether the user is holding the mobile device 120 up to the left side or right side of the user's head. Each of these positions would potentially block the signals from a different set of SVs due to the user's head occluding the signals. The orientation information can also be used to determine whether other parts of the user's body may be occluding signals and/or other objects such as a table or desk may be occluding signals. For example, if the mobile device 120 is located in a flat position and is stationary, the user may be using the mobile device 120 on a desk, table, or other similar object that may occlude SV signals.

The SV selection unit 362 can also be configured to store blocked zone information in a memory of the mobile device 120 and/or to send the blocked zone information to a network entity, such as the location server 160. The stored blocked zone information can be used to build a database of blocked zone information that the SV selection unit 362 can use again in the future without having to redetermine blocked zone information for a particular location. The blocked zone information database can also allow the SV selection unit 362 to conserve power by reducing or eliminating the need for the sensor data collected in stage 410. For example, the blocked zone information database can be organized by location. The SV selection unit 362 can be configured to obtain coarse location information from the position determination unit 364 of the mobile device 120 and/or from the location server 160. The SV selection unit 362 can also obtain at least a portion of the blocked zone information database from the location server 160. The location server 160 can provide the blocked zone database information to the mobile device 120 in response to a request for assistance data from the location server 160 and/or can push the blocked zone database information to the mobile device 120 the location server 160 determines or is informed that the mobile device 120 is located at a particular location. The SV selection unit 362 can conserve power by reducing or eliminating the need for sensor information for determining the blocked zones by using the blocked zone information database. For example, the SV selection unit 362 can be configured to turn off one or more camera sensors that would otherwise have been used to determine blocked zone information. The SV selection unit 362 can be configured to turn off or reduce the frequency at which sensor data from the at least one sensor 235 is acquired by relying on the blocked zone database information.

One or more SVs can be selected from the SV information based on the one or more blocked zones (stage 420). The SV selection unit 362 of the mobile device 120 can be configured to select a subset of the SVs from which the GNSS receiver of the mobile device 120 can attempt to acquire signals. The SV selection unit 362 can be configured to prioritize those SVs not associated with a blocked zone over SVs that are not associated with blocked zones when selecting the SVs, since the signals associated with SVs associated with a blocked zone are likely to be obstructed and unable to reach the mobile device 120. The SV selection unit 362 can be configured to prioritize the SVs that are associated with a blocked zone according to a level of obstruction associated with the blocked zone.

The SV selection unit 362 can also be configured to determine whether a threshold number of SVs are outside of the one or more blocked zones such that a determination of position of the mobile device 120 should be able to be determined. If an insufficient number of SVs are determined to be outside of the one or more blocked zones, the SV selection unit 362 can be configured to instruct the GNSS receiver of the mobile device 120 to reallocate resources, such as correlators, that may have been allocated for acquiring signals from SVs that have been determined to be in blocked zones to other SVs in the same GNSS constellation or another GNSS constellation.

The SV selection unit 362 can be configured to generate an ordered list of these SVs from which the mobile device 120 can attempt to acquire signals. The ordering of the ordered list can depend on predicted or measured signal to noise ratio (SNR), signal to interference plus noise ratio (SINR), received signal strength indication (RSSI), and/or other signal characteristics based on the position of the SV (as determined from almanac or other information), predicted or measured multi-radio coexistence impact, or other factors. The ordering can also depend on which GNSS constellation belong to and the SV selection unit 362 can be configured to prioritize SVs belonging to certain GNSS constellations over SVs belonging to certain other GNSS constellations in the ordered list. The SV selection unit 362 can be configured to take into account the level of obstruction of the blocked zones when generating the ordered list and can be configured to prioritize SVs associated with blocked zones that have been determined to have a lower level of obstruction over SVs associated with blocked zones that have been determined to have a higher level of obstruction. FIG. 5 provides an example process for prioritizing SVs associated with a blocked zone based on a level of obstruction associated with the blocked zones. FIG. 6 provides an example process for selecting SVs that are not associated with blocked zones. FIG. 7 provides an example process for prioritizing SVs that are not associated with blocked zones over SVs that are associated with blocked zones. The SV selection unit 362 can implement one or more of these processes.

An attempt to acquire signals from the one or more SVs can be made (stage 425). The SV selection unit 362 can be configured to instruct the GNSS receiver to search for the selected SVs in an attempt to acquire signals from the SVs. The GNSS receiver can be configured to provide a location solution that represents the estimated location of the mobile device 120 based on the calculations made using the SV signals. If the SV selection unit 362 has determined that the mobile device 120 is located in a "no view zone" in which all or most signals from the SVs are likely to be blocked, the SV selection unit 362 can utilize an alternative positioning method to determine the position of the mobile device. The SV selection unit 362 can be configured to instruct the position determination unit 364 to attempt to determine the position of the mobile device using an alternative positioning method that does not require signals from GNSS SVs. An example of such a process is illustrated in FIG. 11.

FIG. 5 is a flow diagram of an example process for acquiring Global Navigation Satellite System (GNSS) signals at a mobile device according to the techniques discussed herein. The process illustrated in FIG. 5 can be implemented using the mobile device 120 illustrated in FIGS. 1-3, unless otherwise specified. The SV selection unit 362 of the mobile device 120 can provide means for performing the various stages of the process illustrated in FIG. 5 unless otherwise specified. Stage 505 of the process illustrated in FIG. 5 can implement, at least in part, stage 415 of the process illustrated in FIG. 4, and stage 510 of the process illustrated in FIG. 5 can implement, at least in part, stage 420 of the process illustrated in FIG. 4. The SV selection unit 362 can be configured to take into account the level of obstruction of the blocked zones when generating the ordered list and can be configured to prioritize SVs associated with blocked zones that have been determined to have a lower level of obstruction over SVs associated with blocked zones that have been determined to have a higher level of obstruction. The SV selection unit 362 can be configured to distinguish between different levels of obstructions associated with blocked zones. The SV selection unit 362 can use the level of obstruction information to determine "access zones" where the level of obstruction is below a predetermined threshold, and thus, the GNSS receiver of the mobile device 120 may be able to receive signals from the SVs of one or more GNSSs.

A level of obstruction associated with the one or more blocked zones can be determined (stage 505). The SV selection unit 362 can be configured to determine a level of obstruction associated with a blocked zone. The level of obstruction can be based on various factors depending on the types of physical obstructions that are present in a blocked zone. The SV selection unit can be configured to assign an obstruction value to various factors associated with a blocked zone to determine a level of obstruction associated with the blocked zone by summing the obstruction values associated with each of the obstructions for the blocked zone to arrive at the level of obstruction for that zone. A zone having a zero level of obstruction would provide an unobstructed view to the SV signals at the mobile device 120 while in zones having increasingly higher levels of obstruction the mobile device 120 would be increasingly more likely to encounter obstructions that would block SV signals.

The SV selection unit 362 can be configured to utilize map data, including topographical map data, to identify potential physical obstructions in an area. The SV selection unit 362 can be configured to take into account the height and/or density of buildings and/or other structures in the area. Taller buildings are more likely to block the SV signals than lower buildings, and denser areas of structures may be more likely to block SV signals than lower density areas of structures. The SV selection unit 362 can be configured to apply a higher levels of obstruction to areas having higher building density and/or building height. The SV selection unit 362 can also be configured to take into account natural obstructions, such as trees, hills, mountains, canyons, and valleys. The mobile device 120 is more likely to encounter blocking of SV signals when located in a canyon or valley than when located on a flat plain. Furthermore, the density of tree cover can be taken into account. A few widely spaced trees would be less likely to block the SV signals than a dense tree canopy. The SV selection unit 362 can be configured to apply a higher level of obstruction to areas having a denser tree canopy, to areas having higher canyon or valley walls, and/or to areas having higher hills and/or mountains that may block an SV signal.

SVs not associated with the one or more blocked zones can be prioritized based at least in part on the level of obstruction associated with each of the one or more blocked zones (stage 510). The SV selection unit 362 can be configured to prioritize those SVs associated with blocked zones that have a lower level of obstruction over those associated with blocked zones that have a higher level of obstruction when selecting SVs from which signals are to be acquired by the GNSS receiver.

FIG. 6 is a flow diagram of an example process for acquiring Global Navigation Satellite System (GNSS) signals at a mobile device according to the techniques discussed herein. The process illustrated in FIG. 6 can be implemented using the mobile device 120 illustrated in FIGS. 1-3, unless otherwise specified. The SV selection unit 362 of the mobile device 120 can provide means for performing the various stages of the process illustrated in FIG.

6 unless otherwise specified. The process illustrated in FIG. 6 can implement, at least in part, stage 420 of the process illustrated in FIG. 4.

SVs can be identified from the SV information that are not associated with the one or more blocked zones (stage 605). The SV selection unit 362 of the mobile device can be configured to identify SVs, from the SV information, that are not associated with one or more of the blocked zones. The SV selection unit can be configured to determine which SVs are likely to fall within the blocked zone based on the ephemeris information included in the SV information. The SV selection unit, as discussed above with respect to stage 415 of the process illustrated in FIG. 4, the SV selection unit 362 can determine one or more blocked zones based on sensor data from the at least one sensor 235 of the mobile device. The SV selection unit 362 can be configured to compare the blocked zone information determined in stage 415 with the SV information accessed in stage 415 to identify SVs that should be positioned such that their signals should not be obstructed from reaching the mobile device 120, and thus, are outside of the one or more blocked zones.

One or more of the SVs can be selected from the SV that are not associated with the one or more blocked zones (stage 610). The SV selection unit 362 can be configured to select one or more of the SVs that are expected to be visible to the mobile device 120 and are not associated with a blocked zone. The GNSS receiver can be configured to attempt to acquire the signals from the selected SVs, and once signals from a sufficient number of SVs have been acquired, a position estimate for the mobile device 120 can be determined.

FIG. 7 is a flow diagram of an example process for selecting one or more SVs from the SV information according to the techniques discussed herein. The process illustrated in FIG. 7 can be implemented using the mobile device 120 illustrated in FIGS. 1-3, unless otherwise specified. The SV selection unit 362 of the mobile device 120 can provide means for performing the various stages of the process illustrated in FIG. 7 unless otherwise specified. The process illustrated in FIG. 7 can implement, at least in part, stage 420 of the process illustrated in FIG. 4.

SVs from the SV information that are not associated with the one or more blocked zones can be identified (stage 705). The SV selection unit 362 of the mobile device can be configured to identify SVs from the SV information that are not associated with one or more of the blocked zones. The SV selection unit can be configured to determine which SVs are likely to fall within the blocked zone based on the ephemeris information included in the SV information. The SV selection unit, as discussed above with respect to stage 415 of the process illustrated in FIG. 4, the SV selection unit 362 can determine one or more blocked zones based on sensor data from the at least one sensor 235 of the mobile device. The SV selection unit 362 can be configured to compare the blocked zone information determined in stage 415 with the SV information accessed in stage 415 to identify SVs that should be positioned such that their signals should not be obstructed from reaching the mobile device 120, and thus, are outside of the one or more blocked zones.

SVs not associated with the one or more blocked zones can be prioritized over SVs associated with the one or more blocked zones when selecting SVs (stage 710). The SV selection unit 362 can be configured to select one or more of the SVs that are expected to be visible to the mobile device 120 and are not associated with a blocked zone in preference to SVs that are not. The GNSS receiver can be configured to attempt to acquire the signals from the selected SVs, and once signals from a sufficient number of SVs have been acquired, a position estimate for the mobile device 120 can be determined.

Figure 8:
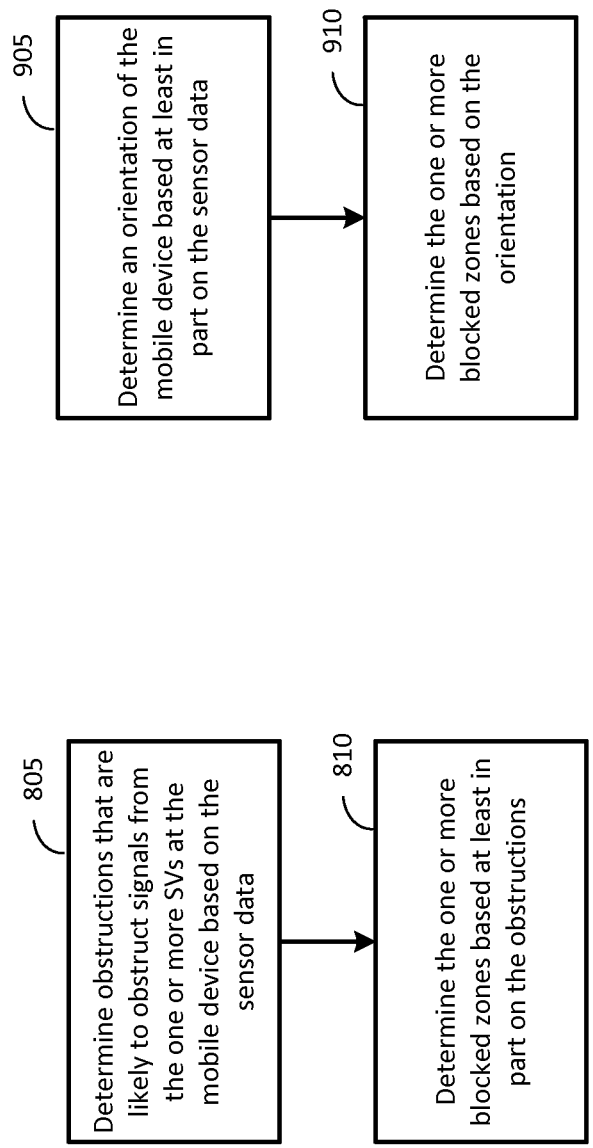
FIG. 8 is a flow diagram of an example process for determining one or more blocked zones according to the techniques discussed herein.

FIG. 8 is a flow diagram of an example process for determining one or more blocked zones according to the techniques discussed herein. The process illustrated in FIG. 8 can be implemented using the mobile device 120 illustrated in FIGS. 1-3, unless otherwise specified. The SV selection unit 362 of the mobile device 120 can provide means for performing the various stages of the process illustrated in FIG. 8 unless otherwise specified. The process illustrated in FIG. 8 can implement, at least in part, stage 415 of the process illustrated in FIG. 4.

Obstructions that are likely to obstruct signals from the one or more SVs at the mobile device can be identified based on the sensor data (stage 805). The mobile device 120 can include at least one sensor 235 that can be used to identify obstructions that are likely to obstruct the signals from the GNSS SVs. The mobile device can include a camera that can be used to capture one or more images or video content of the area surrounding the mobile device, and the SV selection unit 362 can be configured to analyze the one or more images to identify objects that are likely to obstruct signals from the SVs. The SV selection unit 362 can also be configured to send the one or more images or video content to the location server 160, or other network entity, to have the analysis of the one or more images performed. The SV selection unit 362 can also be configured to analyze the one or more image or video content or to rely on another unit of the mobile device 120 to analyze the content. The SV selection unit 362 or a unit relied upon by the SV selection unit 362 can be configured to implement computer vision techniques, cognitive computing techniques, artificial intelligence techniques, and/or other techniques for processing the images and/or video content. The images and/or video content can be analyzed to identify structures and/or natural features, such as mountains or hills, which can obstruct signals from the SVs. The analysis of the images can include estimating a distance that an obstruction lies from the mobile device 120 and the relative position of the obstruction to the mobile device 120. The images can be analyzed to construct a geometric representation of the obstructions, which can be used to determine whether the obstructions may block GNSS SV signals from reaching the mobile device 120.

Determine the one or more blocked zones based at least in part on the obstructions (stage 810). The SV selection unit 362 can use the obstructions identified in stage 805 to determine the one or more blocked zones surrounding the mobile device 120. The SV selection unit 362 can use coarse location information for the mobile device 120 to estimate where the mobile device is located, where the obstructions are relative to the mobile device, and to determine whether the obstructions are likely to interfere with signals of GNSS SVs. The determination of the blocked zones can be made by projecting out rays from the coarse location estimate for the mobile device and determining whether the rays intersect with the geometric representation of the objections determined in stage 805.

Figure 9:
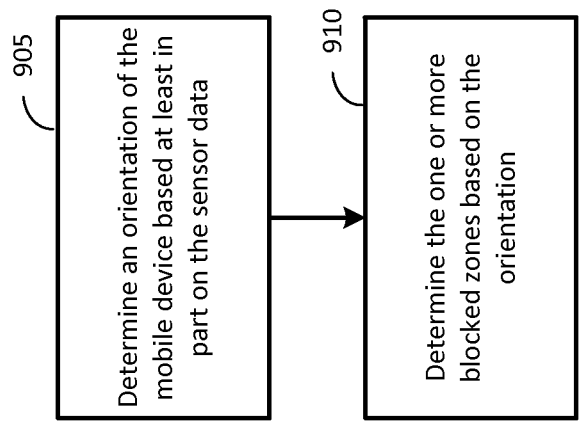
FIG. 9 is a flow diagram of an example process for determining one or more blocked zones according to the techniques discussed herein.

FIG. 9 is a flow diagram of an example process for determining one or more blocked zones according to the techniques discussed herein. The process illustrated in FIG. 9 can be implemented using the mobile device 120 illustrated in FIGS. 1-3, unless otherwise specified. The SV selection unit 362 of the mobile device 120 can provide means for performing the various stages of the process illustrated in FIG. 9 unless otherwise specified. The process illustrated in FIG. 9 can implement, at least in part, stage 415 of the process illustrated in FIG. 4. The orientation of the mobile device 120 can be used when determining the one or more blocked zones associated with the signals from the GNSS SVs.

An orientation of the mobile device can be determined based at least in part on the sensor data (stage 905). The mobile device can include a gyroscope or other type of sensors that can be used to determine the orientation of the mobile device 120. The orientation of the mobile device 120 can also be inferred based on usage data. For example, the SV selection unit 362 can be configured to infer that the device is being held to a user's head if device usage data obtained by the SV selection unit 362 indicates that the device is used to make a call and the device is not being used in a speakerphone mode or with an earpiece or headset. The mobile device can include at least one camera as one of the at least one sensor 235. The camera can be used to capture one or more still images and/or video content that can be used to determine the orientation of the mobile device 120. The SV selection unit 362 can also use the orientation of the mobile device 120 to determine whether the body of the mobile device 120 may create a blocked zone based on the orientation of the mobile device 120. The body of the mobile device 120 may block signals from reaching the antenna or antennas of the GNSS receiver of the mobile device 120 depending on the location of the antenna or antennas in the mobile device 120 and the orientation of the mobile device 120.

Determine the one or more blocked zones based at least in part on the orientation of the mobile device (stage 910). The orientation of the mobile device 120 can be used to determine whether one or more blocked zones are present. The SV selection unit 362 can be configured to use orientation to determine at least two types of blocked zones: blocked zones caused by the mobile device itself, and blocked zones caused by user occlusion. The orientation of the mobile device 120 can create a blocked zone with respect to the antenna 275 of the GNSS receiver, even though the antenna 275 is an omnidirectional antenna. The body of the mobile device 120 can block signals from the SVs depending on the orientation of the mobile device. The SV selection unit 362 can be configured to access information that indicates whether the mobile device 120 has blocked zones associated with the body of the mobile device 120. The blocked zone information can associate an orientation of the mobile device 120 a blocked zone or blocked zones, such that the SV selection unit 362 can determine whether the mobile device 120 is in the same or similar orientation as one of the orientations included in the blocked zone information. The blocked zone information can be stored in the memory 260 of the mobile device, and can be provided by a network entity, such as the location server 160 to the mobile device 120 or can be provided to the mobile device by a manufacturer or distributor of the mobile device 120 either at the time that the mobile device 120 is manufactured or later via a download from a content server associated with the manufacturer, distributor, or reseller of the mobile device 120.

User occlusion can also cause blocked zones, in which the body of a user of the mobile device 120 blocks signals from the SVs from reaching the mobile device 120. The SV selection unit 362 can be configured to use the orientation and usage information of the mobile device 120 to infer whether the mobile device 120 is being held up to the user's head, which can occlude signals from the portion of the sky that is blocked by the user's head. The SV selection unit 362 can be configured to usage information for the device to infer whether the mobile device 120 is likely to be held to the user's head or be subject to obstructions from the user's hand or other body parts. For example, the SV selection unit 362 can be configured to determine whether the mobile device is being used to make a call without using a speakerphone or external headset and to infer that the mobile device 120 is being held up to the user's head if these conditions are met. The orientation of the mobile device 120 relative to the user can be determined based at least in part on usage information and direction of motion of the mobile device 120. For example, the SV selection unit 362 can be configured to determine that if the user of the mobile device 120 is entering text into a text message application or an email application or using a navigation application that provides visual navigation instructions, the mobile device 120 is likely to held in front of the user and not held up to the user's head. Furthermore, the SV selection unit 362 can be configured to obtain heading information from the position determination unit 364 and/or from at least one sensor 235 of the mobile device 120. The usage information and the heading information can be combined to determine that the body of the user of the mobile device is likely oriented "behind" the mobile device 120 or in other words the body of the user of the mobile device is likely to be located opposite the heading in which the mobile device 120 is believed to be traveling. Such estimates could be problematic if the user is located on a moving walkway, escalator, or in or on a vehicle. However, sensor information from the at least one sensor 235 could be used to determine whether the user of the mobile device is walking based on a gait pattern present in the sensor data, and the SV selection unit 362 could be configured to not make assumptions regarding potential blocked zones if the velocity associated with the heading exceeds a predetermined threshold or the gait pattern is not detected.

FIG. 10 is a flow diagram of an example process for determining one or more blocked zones according to the techniques discussed herein. The process illustrated in FIG. 10 can be implemented using the mobile device 120 illustrated in FIGS. 1-3, unless otherwise specified. The SV selection unit 362 of the mobile device 120 can provide means for performing the various stages of the process illustrated in FIG. 10 unless otherwise specified. The process illustrated in FIG. 10 can implement, at least in part, stage 415 of the process illustrated in FIG. 4. The process illustrated in FIG. 10 is similar to that of the process that is illustrated in FIG. 9, except that the process illustrated in FIG. 9 also includes the use of a proximity sensor, which can be configured to generate a signal which indicates that the mobile device 120 is being held proximate to the user of the mobile device. For example, the proximity sensor can generate a signal when the mobile device is being held up to the ear of the user of the mobile device 120.

An orientation of the mobile device and the proximity of the mobile device to a user can be determined based at least in part on the sensor data (stage 1005). As discussed above with respect to stage 905 of the process illustrated in FIG. 9, the SV selection unit 362 can used sensor data from the at least one sensor 235 to determine the orientation of the mobile device. The at least one sensor 235 can also comprise a proximity sensor. The proximity sensor can generate a signal if the mobile device 120 is being held within a certain distance from an object, and can be used to infer whether a user of the mobile device 120 is holding the mobile device 120 to the user's head or other such orientation where signal occlusion may occur discussed herein. For example, the mobile device may be subject to obstructions from the user's hand or other body parts or by nearby items, such as a table or desk, that can obstruct SV signals from reaching the GNSS receiver of the mobile device 120.

One or more blocked zones can be determined based at least in part on the orientation and proximity of the mobile device (stage 1010). As discussed above with respect to stage 910 of the process illustrated in FIG. 9, the SV selection unit 362 can be configured to determine whether user occlusion of SV signals is likely to be occurring. The proximity sensor information combined with the orientation information can be used by the SV selection unit 362 to estimate whether the mobile device 120 is being held up to the user's head or other such orientation where signal occlusion may occur discussed herein. The SV selection unit 362 can be configured to determine, based on the orientation of the mobile device and the proximity indication, which side of the user's head (e.g. left ear or right ear) to which the mobile device 120 is being held. The SV selection unit 362 can also use this and/or other sensor data from the at least one sensor 235 to determine whether the mobile device 120 is being held or is situated such that other types of user occlusion may occur. The SV selection unit can use this information to estimate as to whether there may be one or ore more blocked zones. For example, if user occlusion is suspected, the SV selection unit 362 can be configured to access estimated blocked zone information associated with user occlusion and the SV selection unit 362 can be configured to access estimated blocked zone information associated with device occlusion if device occlusion is suspected. The SV selection unit 362 can also be configured to determine the blocked zones based on image information captured by a camera or other image sensor of the mobile device 120. As discussed above, the SV selection unit 362 can use the sensor data to identify both fixed and non-fixed blocked zones. The SV selection unit 362 can overlay the geometric coordinates of these blocked zones over the ephemeris data for the SVs included in the almanac data or recent position fix data to determine which SVs are likely to fall within a blocked zone and which SVs are not likely to fall within a blocked zone.

FIG. 11 is a flow diagram of an example process for selecting one or more SVs from the SV information according to the techniques discussed herein. The process illustrated in FIG. 11 can be implemented using the mobile device 120 illustrated in FIGS. 1-3, unless otherwise specified. The SV selection unit 362 of the mobile device 120 can provide means for performing the various stages of the process illustrated in FIG. 11 unless otherwise specified. The process illustrated in FIG. 11 can implement, at least in part, stages 420 and 425 of the process illustrated in FIG. 4.

A determination can be made whether the mobile device 120 is located in a zero view zone in which all or most signals from the SVs are likely to be blocked (stage 1105). The SV selection unit 362 can be configured to determine that the mobile device 120 is located in a no view zone in which the GNSS receiver of the mobile device 120 is unlikely to be able to receive a sufficient number signals from SVs in order to make a position determination for the mobile device 120. The SV selection unit 362 can be configured to determine that the mobile device 120 has entered an indoor environment in which the signals from the GNSS SVs would be obstructed. The SV selection unit 362 can be configured to make a determination that the mobile device 120 has entered an indoor environment based on a pressure change as determined by signal data obtained from a pressure sensor of the mobile device 120. The SV selection unit 362 can also be configured to determine that the mobile device 120 has entered an indoor environment based on the signals received from wireless transmitters 115, which may be WiFi or other types of transmitters that typically have a limited range. A network entity, such as the location server 160, can also provide an indication to the mobile device 120 that the mobile device is believed to have entered an indoor environment. The SV selection unit 362 can also be configured to determine that the mobile device 120 has entered a no view zone by determining that the mobile device has entered a tunnel, a narrow canyon, or a narrow space between tall buildings, based on a last known position of the mobile device 120 and a heading of the mobile device. The SV selection unit 362 can be configured to make a determination that the mobile device 120 is located in a no view zone if the mobile device 120 is located in an area that has dense tree cover or a dense tree canopy.

Responsive to determining that the mobile device 120 is located in a zero view zone, an alternative positioning method that does not rely on signals from the SVs to estimate the position of the mobile device can be utilized (stage 1110). The SV selection unit 362 can be configured to place the GNSS receiver in a low power state responsive to determining that the mobile device 120 is located in a zero view zone. The SV selection unit 362 can instruct the position determination unit 364 to utilize alternative means for determining the position of the mobile device 120. For example, the position determination unit 364 can be configured to use signals from one or more wireless base stations (such as wireless base station 140) and/or wireless transmitters 115 to attempt to estimate the location of the mobile device 120. The position determination unit 364 can also be configured to use dead reckoning techniques in order to estimate the location of the mobile device 120. The at least one sensor 235 can comprise accelerometers and gyroscopes for estimating the orientation and velocity of the mobile device 120. The position determination unit 364 can use the velocity and orientation information to estimate the current location of the mobile device 120 based on a last known location of the mobile device 120. The density of the tree canopy for a particular area may be determined from satellite imagery, and the canopy density can be adjusted based on the seasons where the trees are primarily deciduous.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for acquiring Global Navigation Satellite System (GNSS) signals at a mobile device, the method comprising:
   receiving sensor data from at least one sensor of the mobile device;
   determining one or more blocked zones, in which at least a portion of signals from at least one space vehicle (SV) are blocked by an obstruction, and a level of obstruction associated with each of the blocked zones based on the sensor data;
   selecting one or more space vehicles (SVs) from SV information based on the one or more blocked zones, wherein selecting the one or more SVs from the SV information comprises accessing the SV information of one or more GNSSs and prioritizing SVs associated with the one or more blocked zones based at least in part on the level of obstruction associated with each of the one or more blocked zones; and
   attempting to acquire signals from the selected one or more SVs.

2. The method of claim 1, wherein accessing the SV information comprises:
   receiving assistance data at the mobile device that includes the SV information, retrieving the assistance data that includes the SV information from a memory of the mobile device, or a combination thereof.

3. The method of claim 1, further comprising:
   determining a position location of the mobile device based on the acquired signals from the selected one or more SVs.

4. The method of claim 1, wherein selecting the one or more SVs from the SV information based on the one or more blocked zones further comprises:
   selecting SVs not associated with the one or more blocked zones.

5. The method of claim 1, wherein selecting the one or more SVs from the SV information based on the one or more blocked zones further comprises:
   prioritizing SVs not associated with the one or more blocked zones over SVs associated with the one or more blocked zones.

6. The method of claim 1,
   wherein selecting the one or more SVs from the SV information based on the one or more blocked zones further comprises:
   prioritizing SVs not associated with the one or more blocked zones over SVs associated with the one or more blocked zones based at least in part on the level of obstruction associated with each of the one or more blocked zones.

7. The method of claim 1, wherein determining the one or more blocked zones based on the sensor data further comprises:
   identifying obstructions that are likely to obstruct signals from the one or more SVs.

8. The method of claim 7, wherein the sensor data comprises image data from a camera of the mobile device, and wherein identifying the obstructions that are likely to obstruct signals from the one or more SVs comprises identifying the obstructions using the image data.

9. The method of claim 1, wherein determining the one or more blocked zones based on the sensor data further comprises:
   determining the one or more blocked zones based on at least one of an orientation of the mobile device and physical proximity of the mobile device to a user of the mobile device or other obstructions.

10. An apparatus comprising:
    means for receiving sensor data from at least one sensor of a mobile device;
    means for determining one or more blocked zones, in which at least a portion of signals from at least one space vehicle (SV) are blocked by an obstruction, and a level of obstruction associated with each of the blocked zones based on the sensor data;
    means for selecting one or more space vehicles (SVs) from SV information based on the one or more blocked zones, wherein the means for selecting further comprises means for accessing the SV information of one or more Global Navigation Satellite Systems (GNSSs) and means for prioritizing SVs associated with the one or more blocked zones based at least in part on the level of obstruction associated with each of the one or more blocked zones; and
    means for attempting to acquire signals from the one or more SVs.

11. The apparatus of claim 10, wherein the means for selecting the one or more SVs from the SV information based on the one or more blocked zones further comprises:
    means for selecting SVs not associated with the one or more blocked zones.

12. The apparatus of claim 10, wherein the means for selecting the one or more SVs from the SV information based on the one or more blocked zones further comprises:
    means for prioritizing SVs not associated with the one or more blocked zones over SVs associated with the one or more blocked zones.

13. The apparatus of claim 10,
    means for prioritizing SVs not associated with the one or more blocked zones over SVs associated with the one or more blocked zones based at least in part on the level of obstruction associated with each of the one or more blocked zones.

14. The apparatus of claim 10, wherein the means for determining the one or more blocked zones based on the sensor data further comprises:
means for identifying obstructions that are likely to obstruct signals from the one or more SVs.

15. A mobile device comprising:
a memory; and
at least one processor coupled to the memory, the at least one processor being configured to:
receive sensor data from at least one sensor of the mobile device;
determine one or more blocked zones, in which at least a portion of signals from at least one space vehicle (SV) are blocked by an obstruction, and a level of obstruction associated with each of the blocked zones based on the sensor data;
select one or more space vehicles (SVs) from SV information based on the one or more blocked zones, wherein the processor is configured to access the SV information of one or more Global Navigation Satellite Systems (GNSSs) and to prioritize SVs associated with the one or more blocked zones based at least in part on the level of obstruction associated with each of the one or more blocked zones; and
attempt to acquire signals from the one or more SVs.

16. The mobile device of claim 15, wherein the at least one processor being configured to select the one or more SVs from the SV information based on the one or more blocked zones further is further configured to:
select SVs not associated with the one or more blocked zones.

17. The mobile device of claim 15, wherein the at least one processor being configured to select the one or more SVs from the SV information based on the one or more blocked zones is further configured to:
prioritize SVs not associated with the one or more blocked zones over SVs associated with the one or more blocked zones.

18. The mobile device of claim 15,
wherein the at least one processor being configured to select the one or more SVs from the SV information based on the one or more blocked zones is further configured to:
prioritize SVs not associated with the one or more blocked zones over SVs associated with the one or more blocked zones based at least in part on the level of obstruction associated with each of the one or more blocked zones.

19. The mobile device of claim 15, wherein the at least one processor being configured to determine the one or more blocked zones based on the sensor data is further configured to:
identify obstructions that are likely to obstruct signals from the one or more SVs.

20. The mobile device of claim 15, wherein the at least one processor being configured to determine the one or more blocked zones based on the sensor data is further configured to:
determine the one or more blocked zones based on at least one of an orientation of the mobile device and physical proximity of the mobile device to a user of the mobile device.

21. The mobile device of claim 15, wherein the at least one processor being configured to determine the one or more blocked zones based on the sensor data is further configured to:
determine that the mobile device is located in a zero view zone in which all or most signals from the SVs are likely to be blocked; and
utilize an alternative positioning method that does not rely on signals from the SVs to estimate a position of the mobile device.

22. The mobile device of claim 15, wherein the at least one processor being configured to determine the one or more blocked zones based on the sensor data is further configured to:
identify a portion of a coverage area of an omnidirectional antenna of a GNSS receiver of the mobile device.

23. The mobile device of claim 15, wherein the mobile device is stationary.

24. The mobile device of claim 15, wherein the at least one processor being configured to attempt to acquire signals from the one or more SVs is further configured to:
allocate correlators of a GNSS receiver of the mobile device for acquiring signals from the one or more SVs from the SV information.

25. A non-transitory, computer-readable medium, having stored thereon computer-readable instructions for acquiring Global Navigation Satellite System (GNSS) signals at a mobile device, comprising instructions configured to cause a computer to:
receive sensor data from at least one sensor of the mobile device;
determine one or more blocked zones, in which at least a portion of signals from at least one space vehicle (SV) are blocked by an obstruction, and a level of obstruction associated with each of the blocked zones based on the sensor data;
select one or more space vehicles (SVs) from SV information based on the one or more blocked zones, wherein the instructions configured to cause the computer to select the one or more SVs further comprise instructions configured to cause the computer to access the SV information of one or more GNSSs and to prioritize SVs associated with the one or more blocked zones based at least in part on the level of obstruction associated with each of the one or more blocked zones; and
attempt to acquire signals from the one or more SVs.

26. The non-transitory, computer-readable medium of claim 25, wherein the instructions configured to cause the computer to select the one or more SVs from the SV information based on the one or more blocked zones further comprise instructions configured to cause the computer to:
select SVs not associated with the one or more blocked zones.

27. The non-transitory, computer-readable medium of claim 25, wherein the instructions configured to cause the computer to select the one or more SVs from the SV information based on the one or more blocked zones further comprise instructions configured to cause the computer to:
prioritize SVs not associated with the one or more blocked zones over SVs associated with the one or more blocked zones.

28. The non-transitory, computer-readable medium of claim 25,
wherein the instructions configured to cause the computer to select the one or more SVs from the SV information based on the one or more blocked zones further comprise instructions configured to cause the computer to:
prioritize SVs not associated with the one or more blocked zones over SVs associated with the one or more blocked zones based at least in part on the level of obstruction associated with each of the one or more blocked zones.

29. The non-transitory, computer-readable medium of claim 25, wherein the instructions configured to cause the computer to determine the one or more blocked zones based on the sensor data further comprise instructions configured to cause the computer to:
identify obstructions that are likely to obstruct signals from the one or more SVs.

30. The non-transitory, computer-readable medium of claim 25, wherein the instructions configured to cause the computer to determine the one or more blocked zones based on the sensor data further comprise instructions configured to cause the computer to:
determine the one or more blocked zones based on at least one of an orientation of the mobile device and physical proximity of the mobile device to a user of the mobile device.

* * * * *